United States Patent
Volz

(10) Patent No.: US 11,161,183 B2
(45) Date of Patent: Nov. 2, 2021

(54) DRILLING TOOL

(71) Applicant: Robert Bosch GmbH, Stuttgart (DE)

(72) Inventor: Alexander Volz, Baienfurt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/314,432

(22) PCT Filed: Apr. 11, 2017

(86) PCT No.: PCT/EP2017/058630
§ 371 (c)(1),
(2) Date: Dec. 30, 2018

(87) PCT Pub. No.: WO2018/001586
PCT Pub. Date: Jan. 4, 2018

(65) Prior Publication Data
US 2019/0168313 A1    Jun. 6, 2019

(30) Foreign Application Priority Data

Jun. 30, 2016 (DE) ..................... 10 2016 211 953.2

(51) Int. Cl.
*B23B 51/02* (2006.01)

(52) U.S. Cl.
CPC .......... *B23B 51/02* (2013.01); *B23B 2226/75* (2013.01); *B23B 2240/08* (2013.01); *B23B 2251/244* (2013.01); *B23B 2251/40* (2013.01)

(58) Field of Classification Search
CPC . B23B 51/02; B23B 2226/75; B23B 2240/08; B23B 2251/244; B23B 2251/40; B23B 2251/204
See application file for complete search history.

(56) References Cited

U.S. PATENT DOCUMENTS

| 4,080,093 A * | 3/1978 | Maier | ..................... B23B 51/02 |
| | | | 175/394 |
| 7,882,908 B2 * | 2/2011 | Koch | ..................... B23B 51/02 |
| | | | 175/415 |

(Continued)

FOREIGN PATENT DOCUMENTS

| CN | 103492140 A | 1/2014 |
| CN | 103726789 A | 4/2014 |

(Continued)

OTHER PUBLICATIONS

English Machine Translation of DE-102006035443-B3 from (https://worldwide.espacenet.com/) (4 pages) (Year: 2008).*

(Continued)

*Primary Examiner* — Eric A. Gates
*Assistant Examiner* — Paul M Janeski
(74) *Attorney, Agent, or Firm* — Maginot, Moore & Beck LLP

(57) ABSTRACT

A drilling tool, in particular a rock drilling tool, for a portable machine tool includes a drill head, a drill shaft connected to the drill head, and a rotational axis. The drill head in one embodiment is a hard metal drill head, and the drill shaft in one embodiment is connected integrally with the drill head. The drill shaft is configured as one piece, has a guide section with guide groove winding in a spiral-shaped about the drill shaft for transporting away drilling dust, and has a securing section that is configured to detachably secure the drilling tool to a machine tool. The guide section has a diameter reinforcement at a drill head support region of the guide section neighboring the drill head.

15 Claims, 5 Drawing Sheets

(56) References Cited

U.S. PATENT DOCUMENTS

| | | | | |
|---|---|---|---|---|
| 2003/0159544 A1* | 8/2003 | Moser | ............... | B21C 23/147 |
| | | | | 76/108.6 |
| 2004/0001740 A1* | 1/2004 | Rigolet | ............... | B23B 51/02 |
| | | | | 408/227 |
| 2007/0278016 A1* | 12/2007 | Koch | ............... | B23B 51/02 |
| | | | | 175/420.1 |

FOREIGN PATENT DOCUMENTS

| | | | | |
|---|---|---|---|---|
| CN | 105710416 A | 6/2016 | | |
| DE | 199 15 303 A1 | 10/1999 | | |
| DE | 19915303 A1 * | 10/1999 | ............ | B23B 51/00 |
| DE | 198 59 885 A1 | 11/1999 | | |
| DE | 199 15 305 A1 | 10/2000 | | |
| DE | 102 08 630 A1 | 4/2003 | | |
| DE | 198 59 885 B4 | 6/2005 | | |
| DE | 102006035443 B3 * | 2/2008 | ............ | B28D 1/146 |
| DE | 202014103192 U1 * | 7/2014 | ............ | B23B 51/02 |
| EP | 0 792 705 A2 | 9/1997 | | |
| EP | 1 302 290 A1 | 4/2003 | | |
| EP | 1865144 A1 | 12/2007 | | |
| EP | 1 935 540 A2 | 6/2008 | | |

OTHER PUBLICATIONS

English Machine Translation of DE-19915303-A1 from (https://worldwide.espacenet.com/) (17 pages) (Year: 1999).*
International Search Report corresponding to PCT Application No. PCT/EP2017/058630, dated Jun. 20, 2017 (German and English language document) (5 pages).

* cited by examiner

DRILLING TOOL

This application is a 35 U.S.C. § 371 National Stage Application of PCT/EP2017/058630, filed on Apr. 11, 2017, which claims the benefit of priority to Serial No. DE 10 2016 211 953.2, filed on Jun. 30, 2016 in Germany, the disclosures of which are incorporated herein by reference in their entirety.

BACKGROUND

The disclosure relates to a drilling tool and to a method for producing a drilling tool, in particular a rock drilling tool, for a portable power tool,
  having a drill head, in particular a hard-metal drill head;
  having a drill shank that is connected, in particular in a materially integral manner, to the drill head and
  having a rotation axis;
  wherein the drill shank is configured so as to be integral, and for conveying away drilling dust has a conveying portion that in particular has a conveying groove that winds in a helical manner about the bore shank, and a fastening portion which is provided for releasably fastening the drilling tool to a power tool.

Various rock drilling tools having a hard-metal head and a shank connected to the hard-metal head, having a conveying groove that winds about the shank are known. Said shank herein is delimited by a maximum diameter which in the axial direction of a rotation axis of the rock drilling tool remains constant.

SUMMARY

The disclosure is based on the object of improving a drilling tool, in particular a rock drilling tool, by way of simple constructive measures.

The object is achieved by a drilling tool, in particular a rock drilling tool, for a portable power tool,
  having a drill head, in particular a hard-metal drill head;
  having a drill shank that is connected, in particular in a materially integral manner, to the drill head and
  having a rotations axis.

The drill shank is configured so as to be integral, and for conveying away drilling dust has a conveying portion that in particular has a conveying groove that winds in a helical manner about the bore shank, and a fastening portion which is provided for releasably fastening the drilling tool to a power tool.

According to the disclosure the conveying portion on a drill head support region of the conveying portion that neighbors the drill head, in particular is contiguous to the latter, has a diameter reinforcement.

On account of the drilling tool according to the disclosure a particularly stable drill head of the drilling tool is enabled, since a particularly positive coherence of the drill head and the drill shank results by virtue of the diameter reinforcement of the conveying portion of the drilling tool. Furthermore, the service life of the drilling tool is increased in that the diameter reinforcement is provided where the maximum wear is. This typically relates to the drill head and to the drill shank in a drill head support region that supports the drill head. On account thereof, a connection face that connects the drill head and the drill shank is maximized, on the one hand, such that the drill head generates a particularly strong connection to the drill shank, and a particularly high transmission of torque force from a power tool that is capable of operating the drilling tool in a rotary manner to the drill head of the drilling tool is enabled, on the other hand. The risk of shearing between the drill head and the drill shank is also reduced on account of the diameter reinforcement.

By virtue of the diameter reinforcement of the conveying portion, an intermediate space between a drilled hole side wall and a diameter reinforcement is also additionally reduced such that drilling dust that arises in the drilling of the drilling tool can be conveyed out of the drilled hole in a particularly rapid and effective manner by means of the conveying grooves.

On account thereof, less drilling dust remains between the drilled hole side wall and the diameter reinforcement such that an excessive compaction of the drilling dust in the drilled hole is avoided. On account thereof, an excessive compaction of the drilling dust in the drilled hole and an abrupt ejection of drilling dust from the drilled hole resulting therefrom, for example a dust explosion, can be reliably prevented even when drilling deep drilled holes, on account of which an operator of the drilling tool is protected.

The drilling tool according to the disclosure is constructed from at least two parts and comprises an integrally configured drill head having at least one cutting element and an integrally configured drill shank which is connected in a materially integral manner to the drill head, on account of which the drilling tool is configured so as to be integral.

"Integral" is in particular to be understood as meaning at least connected in a materially integral manner, for example by way of a welding process, an adhesive bonding process, an insert-molding process, and/or any other process that is considered expedient by a person skilled in the art, and/or advantageously as molded in one piece, such as for example by way of a production from one casting and/or by way of a production in a single-component or multi-component injection method, and advantageously from a single blank.

The drill head expediently has at least one conveying portion that neighbors the drill head, in particular is contiguous to the latter, and an end of the drill shank that faces away from the drill head has a fastening portion. The fastening portion of the drill shank herein can be configured in a manner similar or identical to conventional commercially available fastening portions of drilling tools such as, for example, SDS, SDS-max, or SDS-plus, such that the fastening region is not discussed in more detail here.

The diameter reinforcement of the drill shank can in particular be produced by turning, for example on a conventional lathe. Alternatively or additionally, the diameter reinforcement can also be produced in another way. An example therefor would be a blank having diameter reinforcement in that, for example, a first end of the blank has a maximum diameter, and a second end of the blank that is provided on a side of the blank that faces away from the first end of the blank has a further maximum diameter, wherein the diameter of the first end exceeds the diameter of the second end. A further example would be a forming method which could be implemented for example by stretching or compressing the blank, or even the drill shank provided with guide grooves, in the radial direction of a rotation axis. A forming method for solid stock of this type could be facilitated by elevated temperatures, for example. Further methods for generating a diameter reinforcement of this type which are not explicitly mentioned here can also be considered.

The dependent claims set forth expedient refinements of the drilling tool according to the disclosure.

It can be expedient that the conveying portion on the drill head support region of the conveying portion that neighbors the drill head, in particular is contiguous to the latter, has a first maximum diameter D1, and on a conveying groove run-out region of the conveying portion that neighbors the fastening portion, in particular is contiguous to the latter, has a second maximum diameter, wherein the first diameter D1 is larger than the second diameter D2. On account thereof, a drilling tool that has a diameter reinforcement of those regions of the drilling tool that are subjected to the most wear is provided. These are typically regions on the drill head and region of the drill shank that neighbor the drill head, in particular are contiguous to the latter.

It can furthermore be expedient that the drill head has at least one secondary cutting element, wherein the drilling tool has a secondary cutting diameter which delimits the at least one secondary cutting element of the drill head and which in particular at least substantially corresponds to the first diameter of the conveying portion. On account thereof, a particularly advantageous transition of a drill head circumferential face of the drill head to a drill shank circumferential face of the conveying portion of the drill shank can be performed, such that a drill head circumferential face of the drill head that projects in the radial direction to the rotation axis in relation to the drill shank circumferential face of the conveying portion is avoided and "catching" of the drilling tool in a drilled hole can thus be prevented.

It can furthermore be expedient that the drill head has at least one primary cutting element, wherein the drilling tool has a primary cutting diameter which delimits the at least one primary cutting element of the drill head and which exceeds the first diameter of the conveying portion. On account thereof, the drilling tool can drill in a friction-reduced manner, since a circumferential face of the primary cutting element is exposed to increased wear, and a reduction of the wearing faces by way of a drill shank circumferential face of the conveying portion that in the radial direction of the rotation axis is recessed in relation to the circumferential face of the primary cutting element, is exposed to only minimized wear.

It can be expedient that the drill head has two primary cutting elements such that no secondary cutting elements are provided. A particularly effective advancing into a workpiece to be machined can be achieved on account thereof.

A "cutting element" in this context is to be understood to be an element which is attached to the drill head and has at least one, in particular wedge-shaped, cutting-edge which is configured for shaping the workpiece by way of separation. The cutting element can in particular be configured in the manner of a segment of a circle in the drill head and can extend counter to the advancing direction up to the connection face of the drill head to the shank. The drilling tool herein can have 2, 3, 4, 5, or a plurality of cutting elements. The cutting element can be configured by a primary and/or secondary cutting element.

The term "cutting edge" here is in particular intended to define an edge of the cutting element which is provided for subtracting, cutting off, and/or scraping off workpiece particles of the workpiece during a machining of a workpiece by means of the cutting element. The cutting edge can be configured as at least a corner and/or at least a sharp taper.

It can furthermore be expedient that the drill head support region of the conveying portion in the axial direction along the rotation axis extends up to 3 times, in particular up to 2 times, preferably up to 1 times, the first diameter. It can furthermore be expedient that the drill head support region of the conveying portion in the axial direction along from a drill head extends up to 50 mm, in particular up to 40 mm, preferably up to 30 mm, more preferably up to 25 mm, particularly preferably up to 20 mm. The maximum diameter in the drill head support region can in particular continuously increase from a drill shank in the direction of the drill head. In particular, the maximum diameter in the drill head support region can abruptly increase from a drill shank in the direction of the drill head. In the case of a continuous increase of the maximum diameter notching effect can be minimized herein.

It can furthermore be expedient that an in particular maximum third diameter of the drill head support region in the axial direction of the rotation axis from the drill head to the drill shank decreases in such a manner, in particular in a continuous manner, that the third diameter of the drill head support region decreases from the first diameter of the drill bed support region of the conveying portion to the second diameter of the conveying groove run-out region of the conveying portion.

It can furthermore be expedient that the first diameter in relation to the second diameter is larger by up to 10%, in particular by up to 8%, preferably by up to 5%, more preferably by up to 3%.

It is furthermore proposed that the drill head has a further drill head conveying groove that adjoins the conveying groove of the conveying portion, wherein the drill head conveying groove in the axial direction of the rotation axis transitions to the conveying groove of the conveying portion, wherein the drill shank is connected in a materially integral manner to the drill head such that the drill head conveying groove is at least in part sheathed or covered, respectively, by a connection material that connects the drill head to the drill shank. On account thereof, a "seamless", or a joint-free, or an edge-free transition, respectively, between the drill head conveying groove and the conveying groove can in particular be performed, such that the drilling dust that arises in a machining of a workpiece can be effectively transported away, and overcomes a transition between the drill head conveying groove and the conveying groove in a resistance-reduced manner.

It is furthermore proposed that the conveying groove is incorporated in the drill shank by subtractive machining, in particular by turning. On account thereof, the drilling tool can particularly advantageously be produced in a rapid and complexity-minimized manner. The material properties of a drill shank surface are also particularly advantageous for a further machining of the drilling tool in production, since solid and hard spots of the drill shank surface arise to a lesser extent, for example, in relation to solid-stock-formed extruded blanks, on account of which a deformation capability of the drill shank, for example in the case of subsequent production steps, is simplified and in particular is more predictable.

The disclosure furthermore relates to a method for producing a drilling tool, in particular a rock drilling tool, comprising at least the following steps:

heating at least in portions a drill head, in particular a hard-metal drill head, and a drill shank;

axially placing the drill shank and the drill head so as to connect the drill shank to the drill head; and joining the drill head and the drill shank.

"Heating" in this context is intended to be understood to be at least partially heating of the mating pairs, in particular of the drill head and of the drill shank, said mating pairs being heated at the mating zones thereof so as to generate a materially integral connection.

"Axial placing" is intended to be understood to be placing at least two mating pairs on top of one another, in particular the drill shank on top of the drill head, said mating pairs that being in particularly mutually compressed by way of a contact pressure.

It is furthermore proposed that at least the drill shank at least in portions is heated to above 1200° C. On account thereof, a particularly simple and advantageous connection of the drill shank to the drill head is achieved, such that a connection face of the drill shank can generate a particularly advantageous connection to the drill head. The joining of the drill head to the drill shank can in particular be performed at a temperature of up to 1500° C., in particular up to 1400° C., preferably up to 1300° C., more preferably up to 1100° C., particularly preferably up to 1000° C., such as for example 900° C.

Various joining methods such as, for example, welding methods and/or soldering/brazing methods, which are well known to a person skilled in the art, can be considered. The joining method can advantageously be performed under a protective gas atmosphere, so as to achieve a particularly good connection between the drill head and the drill shank in that connection faces, in particular the connection face of the drill head and the connection face of the drill shank are protected by a protective gas against the ingress of atmospheric gases such as, for example, $N_2$, $O_2$, or $H_2$.

Substances or mixtures of substances such as aluminum, magnesium, argon, helium, titanium, $O_2$, $CO_2$, or $H_2$ individually or in combination, for example, with argon or argon-helium mixtures can be considered as a protective gas. The protective gas can also be composed of only argon or helium, or the mixtures thereof. Argon, helium, carbon dioxide, or else oxygen, hydrogen, and nitrogen can preferably be used as components of mixtures.

Current production processes in the production of the drilling tool are not, or not notably, influenced, respectively, on account of the helical diameter reinforcement.

A "forming method" in this context is to be understood to be a method in which an elastic and/or plastic deformation is achieved by forming solid stock, in particular a material displacement and/or a material accumulation, of the workpiece. "Forming solid stock" herein is to be understood to be a method such as, for example, rolling, swaging, cold-forming, extruding, forging (open-die forging), compressing, or profile-rolling. The workpiece to be deformed herein is to be deformed by a forming tool such as, for example, by at least one hammer or by at least one disk, in particular a forging disk, of a forming device. For example, two or a plurality of forming tools can be pressed onto the workpiece to be deformed, or a blank, respectively. A desired forming or shaping, respectively, of the drill shank can thus be achieved. An arrangement in a tool device of the at least one forming tool can be derived from EP 0 792 705 A2, for example, which describes how a groove of a drilling tool can be produced.

A "forming tool" in this context is to be understood to be tool of a device for producing drilling tools, which tool is configured for incorporating a deformation of the drilling tool to be produced. The at least one forming tool can be configured as a press device which encompasses a drilling tool, in particular a drill shank, and presses the latter against a drill head. In principle, however, other forming tools that are considered expedient by a person skilled in the art are also possible.

BRIEF DESCRIPTION OF THE DRAWINGS

Further advantages are derived from the following description of the drawings. Exemplary embodiments of the disclosure are presented in the drawings. The drawings, the description, and the claims include numerous features in combination. A person skilled in the art will expediently also consider the features individually and combine them to form meaningful further combinations. In the drawings:

FIG. 5 shows an end-side view onto a drill head of a second embodiment of the drilling tool.

DETAILED DESCRIPTION

Identical components are provided with the same reference signs in the following figures.

The following figures relate in each case to a drilling tool 1, in particular for receiving in a receptacle device 105 of a power tool, preferably a hand-held power tool 101, for machining by drilling and/or impacting in particular mineral materials such as, for example, rock, concrete and/or reinforced concrete. The drilling tool according to the disclosure can also be provided for machining other materials such as timber, plastics material, or a composite, as considered expedient by a person skilled in the art.

The drilling tool is provided for applying a rotary and/or translatory working movement to a workpiece to be machined. A translatory advancement herein is introduced into the workpiece in that the operator of the hand-held power tool applies a force to the hand-held power tool, in particular the hand-held power tool housing 103.

The drilling tool according to the disclosure herein is provided for being received in commercially available SDS receptacle devices of hand-held power tools.

Figure 1:
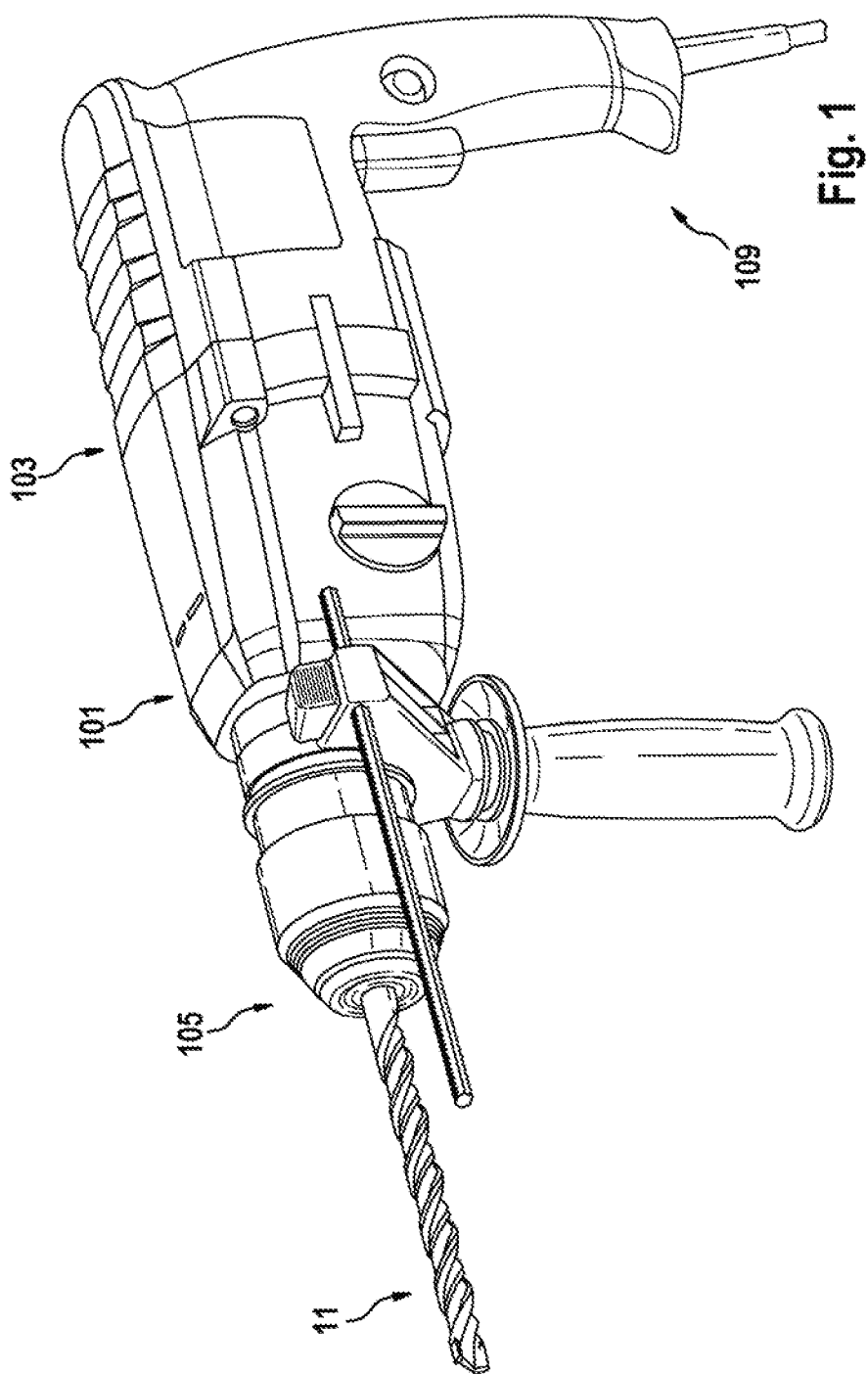
FIG. 1 shows a perspective view of a hand-held power tool having a drilling tool.

FIG. 1 shows a perspective view onto a hand-held power tool 101 having a drilling tool 11 chucked in the receptacle device 105. The hand-held power tool 101 herein has a hand-held power tool housing 103 having at least one handle region 109 for encompassing by at least one hand of an operator. The receptacle device 105 corresponds to an SDS receptacle such as, for example, SDS-max, SDS-plus, SDS-top, SDS-plus, or even SDS-quick, which are already known to a person skilled in the art and commercially available such that the receptacle is not discussed in more detail.

A stationary power tool such as, for example, an industrial power tool, as well as a non-stationary power tool such as, for example, a hand-held power tool in the form of an impact drill or in the form of a drill hammer are suitable herein as a power tool.

The drilling tool in this embodiment is configured as a rock drilling tool and is provided for machining workpieces from rock, concrete, reinforced concrete and/or similar materials.

Figure 2:
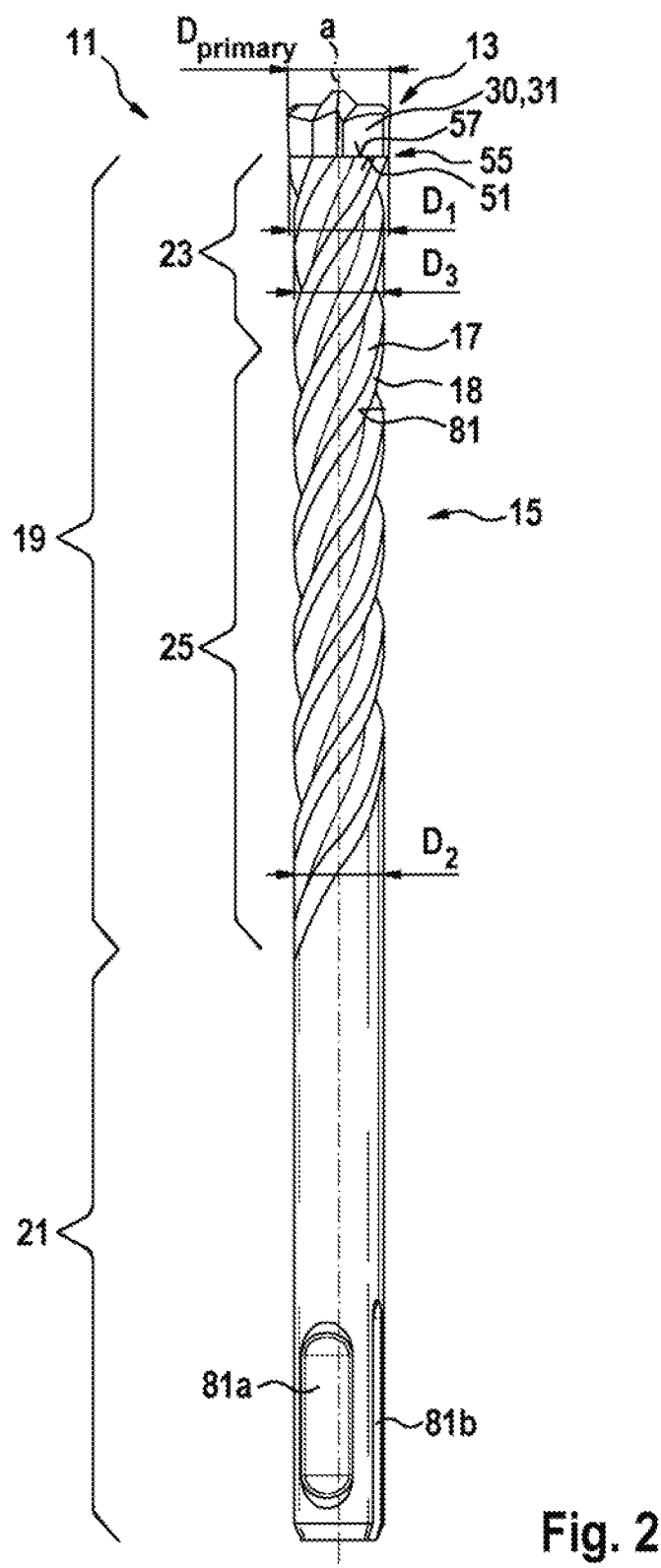
FIG. 2 shows a view onto a first embodiment of a drilling tool according to the disclosure.

FIG. 2 shows the drilling tool 11 from FIG. 1. The drilling tool 11 is configured so as to be substantially cylindrical and extends axially along a tool axis a. The drilling tool 11 has at least one drill head 13 and a drill shank 15 that is connected to the drill head 13. The drill head 13 and the drill shank 15 in the production are embodied in one piece and mutually separated, and in the production of the drilling tool 11 are joined in a materially integral manner such that the joined drilling tool is integrally configured.

The drill head 13 can preferably be configured from a hard metal material so as to withstand highest stresses in terms of wear. The drill head 13 herein is in particular embodied as a solid hard-metal head such that the drill head 13 delimits the axial extent of the drill shank 15 in the axial direction of the rotation axis a. The drill head 13 comprises a plurality of cutting elements which are configured for subtracting, cutting, scraping and/or shattering the workpiece to be machined. The cutting elements, depending on the embodiment of the drill head 13, can be subdivided into primary cutting elements 71 and/or secondary cutting elements 75.

The drill shank 15 herein can preferably be configured from a steel material. The drill shank 15 along the rotation axis a has a drill shank 15 that is contiguous to the drill head 13. The drill shank 15 herein is connected in a materially integral manner, in particular with the aid of an additive or without the aid of any additive, to the drill head 13.

The drill shank has a conveying portion 19 and a fastening portion 21 that is contiguous to the conveying portion 19. The fastening portion 21 herein is disposed on a side of the conveying portion 19 that faces away from the drill head 13.

The conveying portion 19 has four conveying grooves 17 which wind in a helical manner about the rotation axis a and which are provided for conveying drilling dust that arises when drilling, for example when drilling a drilled hole into a workpiece, out of the drilled hole from a direction that faces away from the drill head 13 along an axial direction of the rotation axis a. Alternatively or additionally, fewer than four such as, for example, a single, two or three, conveying grooves 17 or more than four such as, for example, five, six or more, conveying grooves 17 can also be configured.

The helical conveying grooves 17 in the circumferential direction about the rotation axis a are separated by webs 18 which wind in a helical manner about the rotation axis a. The webs 18 run so as to be parallel with the conveying grooves 17 and are correspondingly configured so as to be helical. A maximum extent in the radial direction of the rotation axis a of the webs 18 herein delimits the maximum extent of the drilling tool 11 in the radial direction of the rotation axis a. The webs 18 have in each case one web circumferential face 81 which delimits the webs 18 in the radial direction of the rotation axis a and which defines a diameter of the drill shank 15, or of the conveying portion 19, respectively, about the rotation axis a that delimits the conveying portion 19 of the drill shank 15. The web circumferential face 81 is provided, for example, for sliding along a drilled hole wall (not illustrated in more detail) and for delimiting radial movement of the drilling tool 11 in a drilled hole.

According to the disclosure the diameter of the conveying portion 19 of the drill shank 13 at least in portions varies along the rotation axis a and forms a diameter reinforcement, or a diameter increase, that neighbors the drill head 13, in particular is contiguous to the latter.

The conveying portion 19 has a drill head support region 23 which is disposed so as to neighbor the drill head 13, in particular to be contiguous to the latter, and which is provided for supporting the drill head 13 in the axial direction of the rotation axis a and for transmitting a movement, in particular at translatory impact movement in the axial direction of the rotation axis a, and/or a rotary cutting movement or subtracting movement, respectively, about the rotation axis a, to the drill head 13 and correspondingly also to the workpiece to be drilled.

The conveying portion 19 on the drill head support region 23 of the conveying portion 19 that is contiguous to the drill head 13 has a first maximum diameter D1, and on a conveying groove run-out region 25 of the conveying portion 19 that in the axial direction of the rotation axis a is contiguous to the fastening portion 21 has a second maximum diameter D2. The first diameter D1 herein is larger than the second diameter D2. The first diameter D1 in relation to the second diameter D2 is larger by up to 8%, such that a moderately larger diameter is provided on a region of the conveying portion that is contiguous to the drill head 13. On account thereof, an optimum flow of force is enabled through an entire cross section of the drill shank 15. The conveying groove run-out region 25 is in particular provided for conveying drilling dust from the drilled hole such that the drill head support region 23 of the conveying portion 19 is disposed between the drill head 13 and the conveying groove run-out region 25.

The drill head support region 23 of the conveying portion 19 in the axial direction extends along the rotation axis a up to 3 times the first diameter D1.

The drill head support region 23 of the conveying portion 19 in the axial direction along the rotation axis a can extend by up to 25 mm from a drill head 13, in particular of a connection region of the drill head and of the drill shank.

The drill head 13 has a further drill head conveying groove 31 that adjoins the conveying groove 17 of the conveying portion 19, wherein the drill head conveying groove 31 in the axial direction of the rotation axis a transitions to the conveying groove 17 of the conveying portion 19.

The drill shank 15 is connected in a materially integral manner to the drill head 13 such that the drill head conveying groove 31 is at least in part sheathed by a connection material 83 that connects the drill head 13 to the drill shank 15. On account thereof, an in particular edge-free transition between the drill head conveying groove 31 and the conveying groove 17 can be embodied such that subtracted drilling dust is conveyed out of the drilled hole in a particularly simple and rapid manner. The connection material herein can in particular comprise the steel material of the drill shank and/or at least in proportions the hard-metal material of the drill head and/or an auxiliary material, for example for a welded or soldered/brazed connection that connects the drill head and the drill shank.

The auxiliary material can preferably be embodied for connecting the drill head and the drill shank by means of a welded and/or a soldered/brazed connection, for example. Auxiliary materials such as, for example, aluminum, silicon, nickel and/or tin can be used herein.

The drill shank can be embodied as a turned blank. Alternatively, the drill shank can be embodied as an extruded blank.

The drill shank 15 furthermore has a fastening portion 21 which in the axial direction of the rotation axis a is contiguous to the conveying portion 19 and which is provided for releasably fastening the drilling tool 11 by way of a power tool 101.

FIGS. 3 to 6 show a plurality of views of the drill head 13 having two primary cutting elements 71, or two primary cutting edges 73, respectively, and/or two secondary cutting elements 75, or two secondary cutting edges 77, respectively.

Figure 4:
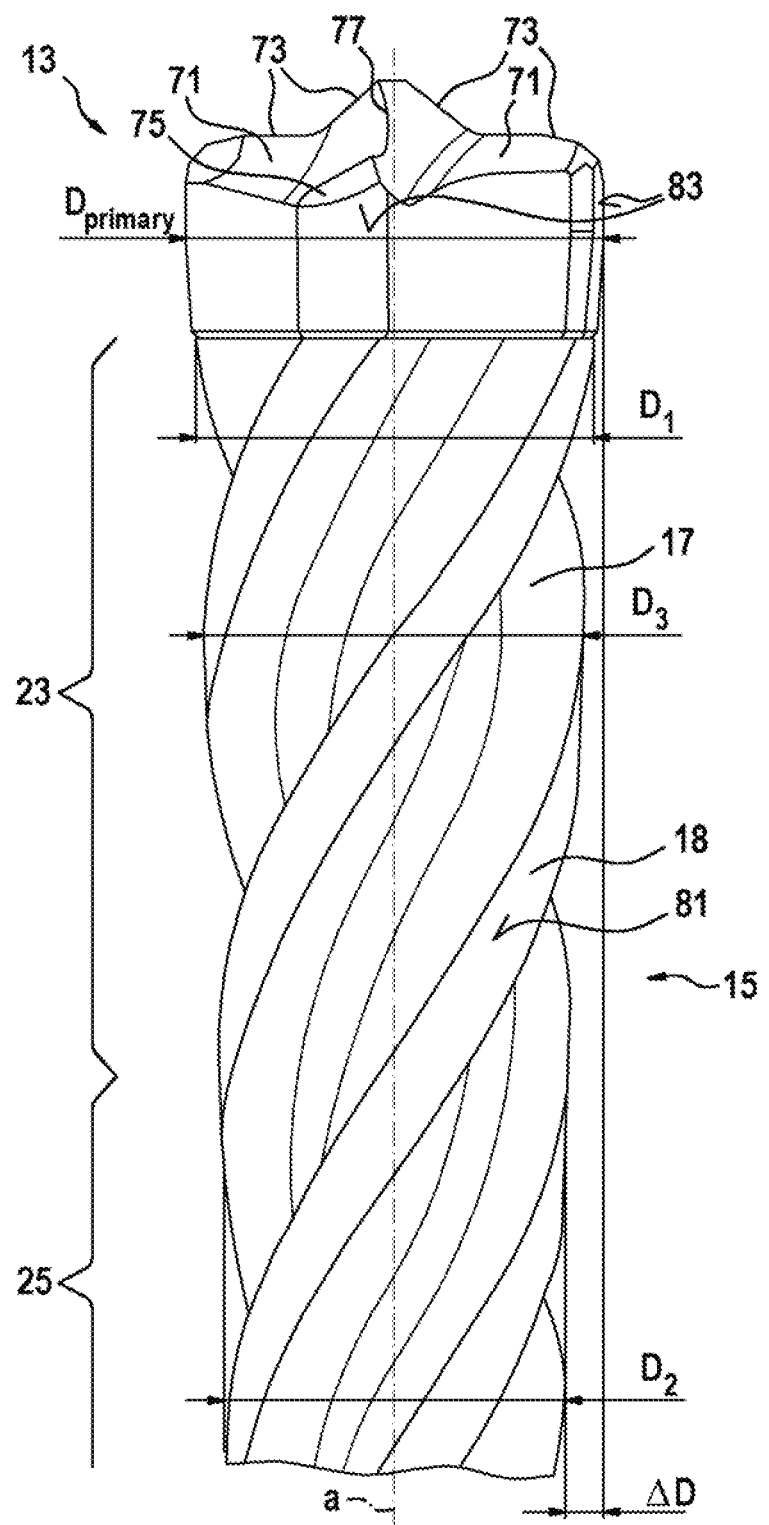
FIG. 4 shows a further view onto the drilling tool from FIG. 2.
Figure 5:
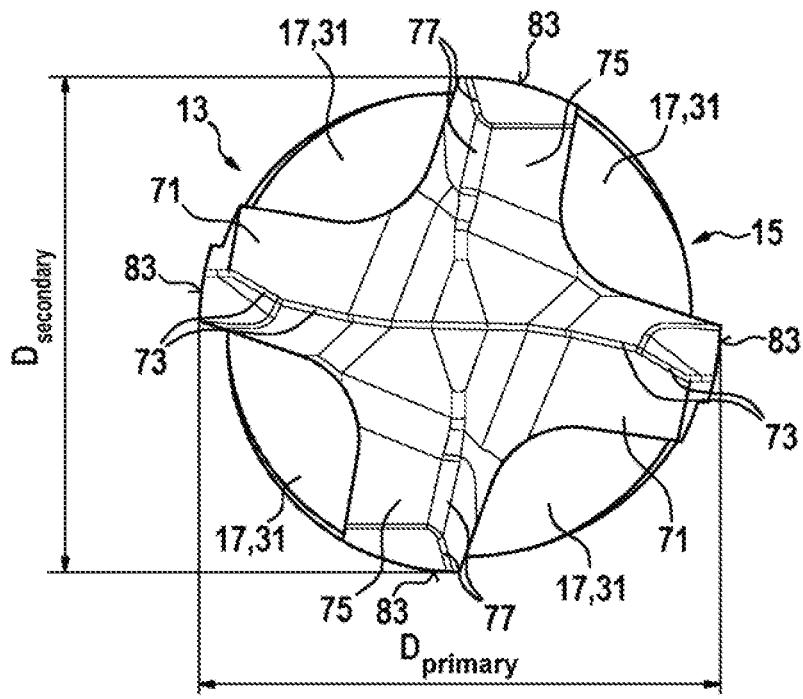
FIG. 5 shows an end-side view onto a drill head of the drilling tool from FIG. 2.

The drill head 13 from FIG. 4 herein has a primary cutting diameter D_primary which delimits the at least one primary cutting element 71, or the primary cutting edge 73, respectively, of the drill head 13 and which exceeds the first diameter D1 of the conveying portion 19 in the radial direction of the rotation axis a.

Figure 3:
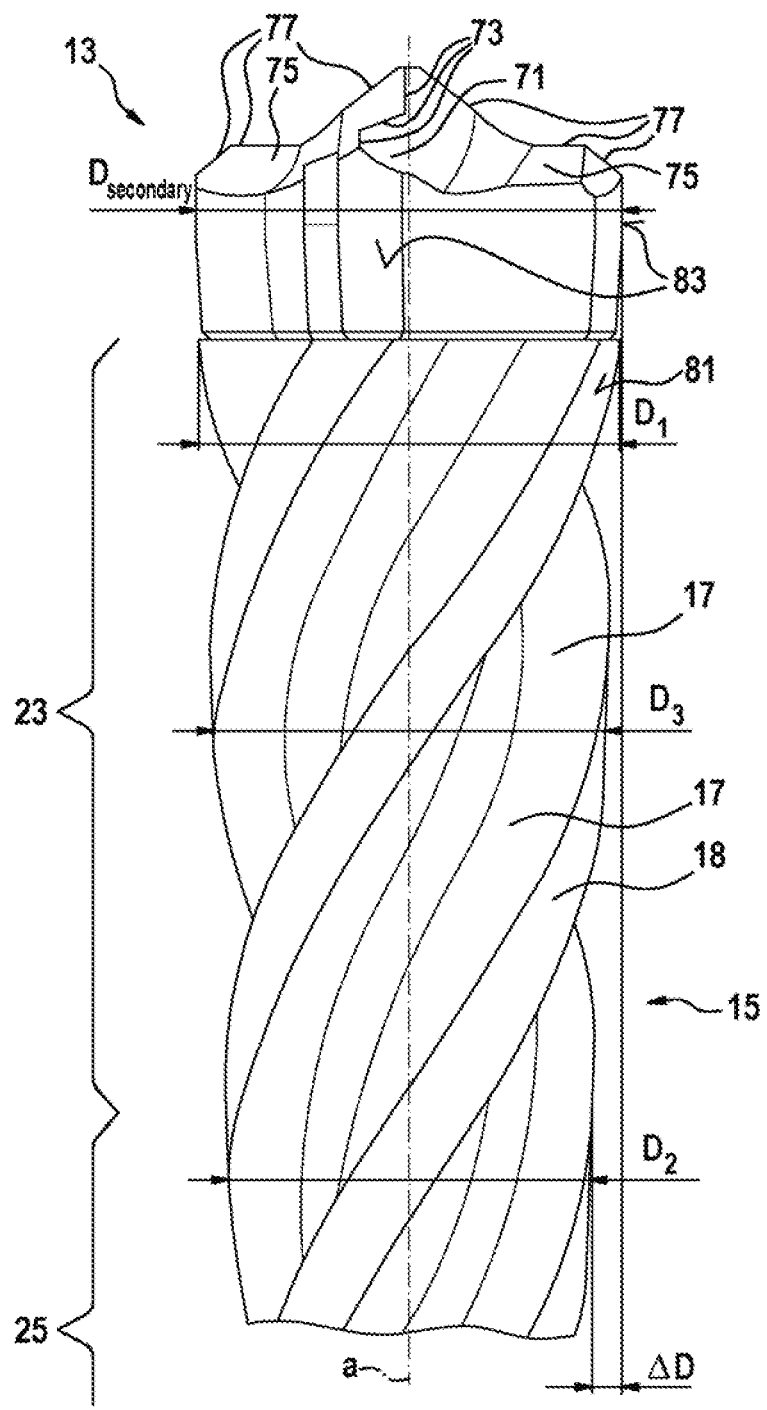
FIG. 3 shows a further view onto the drilling tool from FIG. 2.

The drill head 13 from FIG. 3 furthermore has a secondary cutting diameter D secondary which delimits the at least one secondary cutting element 75, or the secondary cutting edge 77, respectively, of the drill head 13 and which in particular at least substantially corresponds to the first diameter D1 of the conveying portion 19.

Figure 6:
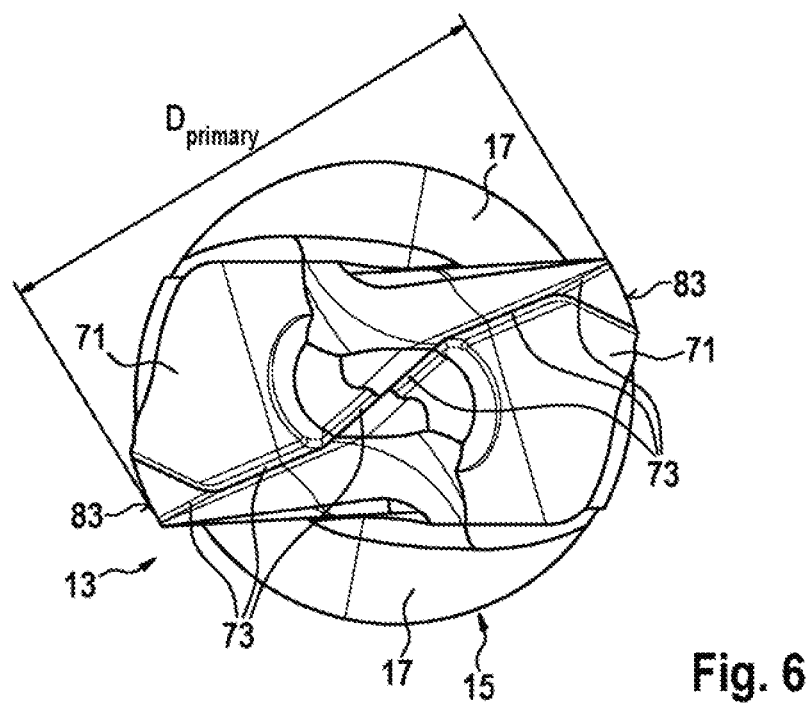
FIG. 6 shows an end-side view onto a drill head of a second embodiment of the drilling tool.

FIG. 6 shows a further embodiment of the drilling tool, wherein the drill head 13 is composed of two primary cutting elements 71 such that no secondary cutting elements 75 are provided.

The fastening portion 21 has a plurality of radial clearances which are provided for forming a form-fitting and/or force-fitting connection of the drilling tool, in particular of the fastening portion 21 of the drilling tool, to the hand-held power tool 101. The clearances 81a, 81b are configured so as to be at least in part analogous to, in particular similar to, preferably identical to, clearances of an SDS receptacle of a drilling tool. The fastening portion 21 of the drilling tool 11 herein can be configured so as to be identical to conventional commercially available fastening portions such as, for example, SDS, SDS-max, or SDS-plus. SDS fastening portions of this type are known to a person skilled in the art and commercially available such that a detailed description of the arrangement and design embodiment of said clearances 81a, 81b is dispensed with.

The drill head 13 and the drill shank 15 are connected to one another by means of the joining method and form a connection region 55 of the drilling tool 11. The connection region 55 herein comprises a first connection face 51 of the drill head 13 and a second connection face 57 of the drill shank 15. The first connection face 51 and the second connection face 57 herein form an at least substantially mutually identical connection faces which are connected to one another such that the first connection face 51 covers the second connection face 52 in particular in a fully planar manner.

The invention claimed is:

1. A drilling tool for a portable power tool, comprising:
    a drill head formed as a solid hard-metal head having at least one primary cutting element and at least one secondary cutting element that defines a secondary cutting diameter;
    a drill shank connected to the drill head by welding or soldering/brazing; and
    a rotation axis,
    wherein the drill shank is configured so as to be integral and has (i) a conveying portion with a conveying groove that winds in a helical manner about the shank so as to convey away drilling dust and (ii) a fastening portion that is configured for releasably fastening the drilling tool to a power tool,
    wherein the conveying portion has a drill head support region adjacent to the drill head that has a diameter reinforcement defining a first maximum diameter that corresponds to the secondary cutting diameter,
    wherein the conveying portion has a conveying groove run-out region adjacent to the fastening portion, the conveying groove run-out region having a second maximum diameter adjacent to the fastening portion, the first maximum diameter being larger than the second maximum diameter, and
    wherein the drill head support region extends from the drill head in an axial direction by up to 25 mm.

2. The drilling tool as claimed in claim 1, wherein the at least one primary cutting element defines a primary cutting diameter which delimits the at least one primary cutting element and which exceeds the first maximum diameter of the conveying portion.

3. The drilling tool as claimed in claim 1, wherein the drill head support region extends in the axial direction up to 3 times the first maximum diameter.

4. The drilling tool as claimed in claim 3, wherein the drill head support region of the conveying portion extends in the axial direction up to 1 times the first maximum diameter, and wherein the drill head support region of the conveying portion extends in the axial direction from the drill head up to 20 mm.

5. The drilling tool as claimed in claim 1, wherein an outer diameter of the drill head support region decreases in the axial direction from the first maximum diameter at the drill head to the second maximum diameter at a transition from the drill head support region to the run-out region.

6. The drilling tool as claimed in claim 5, wherein the outer diameter of the drill head support region decreases in the axial direction in a continuous manner from the first maximum diameter adjacent to the drill head to the second maximum diameter at the transition between the drill head support region and the run-out region.

7. The drilling tool as claimed in claim 1, wherein the first diameter is up to 10% greater than the second diameter.

8. The drilling tool as claimed in claim 7, wherein the first diameter is up to 3% greater than the second diameter.

9. The drilling tool as claimed in claim 1, wherein the drill head has a drill head conveying groove that adjoins the conveying groove of the conveying portion, wherein the drill head conveying groove transitions in the axial direction to the conveying groove of the conveying portion, and wherein the drill shank is connected in a materially integral manner to the drill head such that the drill head conveying groove is at least in part sheathed by a connection material that connects the drill head to the drill shank such that the transition between the drill head conveying groove and the conveying groove is seamless.

10. The drilling tool as claimed in claim 1, wherein the conveying groove is incorporated in the drill shank by subtractive machining.

11. The drilling tool as claimed in claim 10, wherein the conveying groove is incorporated in the drill shank by turning.

12. The drilling tool as claimed in claim 1, wherein the drill head support region is contiguous to the drill head.

13. The drilling tool as claimed in claim 1, wherein the drill head support region is contiguous to the drill head, and wherein the conveying groove run-out region is contiguous to the fastening portion.

14. The drilling tool as claimed in claim 1, wherein the solid hard-metal head delimits an axial extent of the drill shank in the axial direction.

15. A method for producing a drilling tool, the method comprising:
    heating at least portions of a drill head, which is formed as a solid hard-metal head having at least one primary cutting element and at least one secondary cutting element defining a secondary cutting diameter, and a drill shank, the drill shank configured so as to be integral and having (i) a conveying portion with a conveying groove that winds in a helical manner about the shank so as to convey away drilling dust and (ii) a fastening portion that is configured to releasably fasten the drilling tool to a power tool, the conveying portion has a drill head support region adjacent to the drill head that has a diameter reinforcement defining a first maximum diameter that corresponds to the secondary cutting diameter, and the conveying portion has a conveying groove run-out region is adjacent to the fastening portion and has a second maximum diameter adjacent to the fastening portion, the first maximum diameter being larger than the second maximum diameter, wherein the drill head support region extends from the drill head in an axial direction by up to 25 mm;

axially placing the drill shank and the drill head so as to connect the drill shank to the drill head; and joining the drill head and the drill shank by welding or soldering/brazing.

* * * * *